United States Patent [19]
Jeffs et al.
[11] Patent Number: 4,707,337
[45] Date of Patent: Nov. 17, 1987

[54] MEDICAL MICRO PIPETTE TIPS FOR DIFFICULT TO REACH PLACES AND RELATED METHODS

[75] Inventors: David H. Jeffs; Paul M. Jessop, both of Salt Lake City, Utah

[73] Assignee: Multi-Technology, Inc., Salt Lake City, Utah

[21] Appl. No.: 895,104

[22] Filed: Aug. 11, 1986

[51] Int. Cl.[4] .......................... B01L 3/02; G01N 1/14
[52] U.S. Cl. .................................... 422/100; 436/180; 73/864.01; 73/864.14
[58] Field of Search ......................... 422/100; 436/180; 73/864.01, 864.14; 128/348.1, 768; 604/9, 280; 204/180.1

[56] References Cited

U.S. PATENT DOCUMENTS 2,269,823 1/1942 Kreiselman .................... 128/207.15
4,596,563 6/1986 Pande .................................. 604/280

FOREIGN PATENT DOCUMENTS 0207154 2/1984 Denmark ............................ 422/100

OTHER PUBLICATIONS

Labindustries Today-Liquid Handling Systems (Advertisement) Feb. 1983, Labindustries, All Pages.
Labindustries Positive Displacement Pipettor Advertisement *Biomedical Products,* May 1986, pp. 12 and 42.
Costar Pipette Tips Advertisement *Biomedical Products,* May 1986, p. 19.
Gibcoware Advertisements Biomedical Products, May 1986, p, 17.
Eppendorf Micro Pipette Advertisements.
Brink Micro Pipette Advertisement.
*Biomedical Products,* Mar. 1986, p. 46.
Drummond Sequencing Pipet.

*Primary Examiner*—David L. Lacey
*Assistant Examiner*—Floyd Bennett
*Attorney, Agent, or Firm*—Lynn G. Foster

[57] ABSTRACT

Los cost medical micro pipette tips for difficult to reach places, and related methds. The leading or distal portion of the micro pipette tips are materially elongated and ultra thin. This accommodates placement of the distal influent port, for receiving expensive biological extracts, in hard to reach places.

10 Claims, 15 Drawing Figures

Fig. 1
(PRIOR ART)
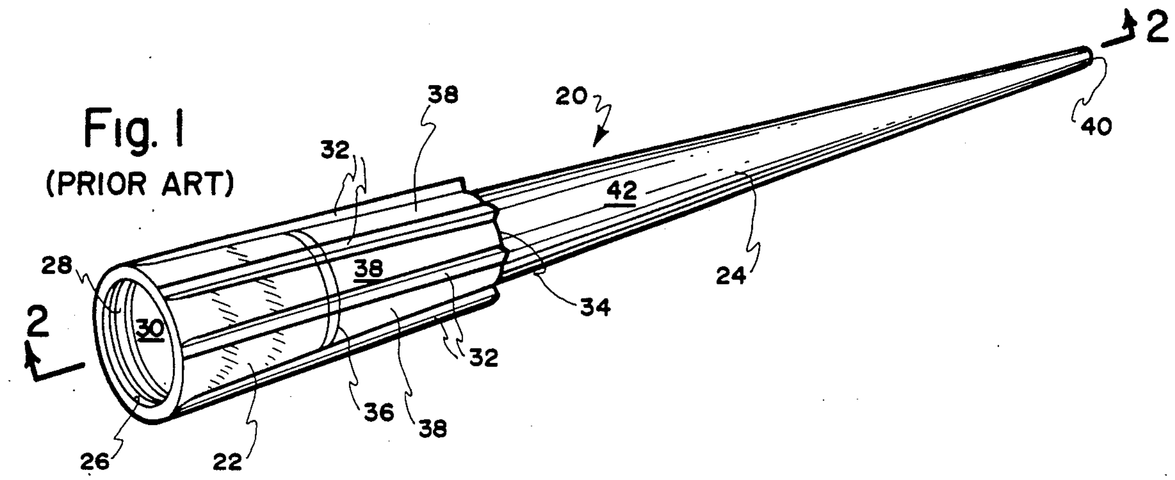
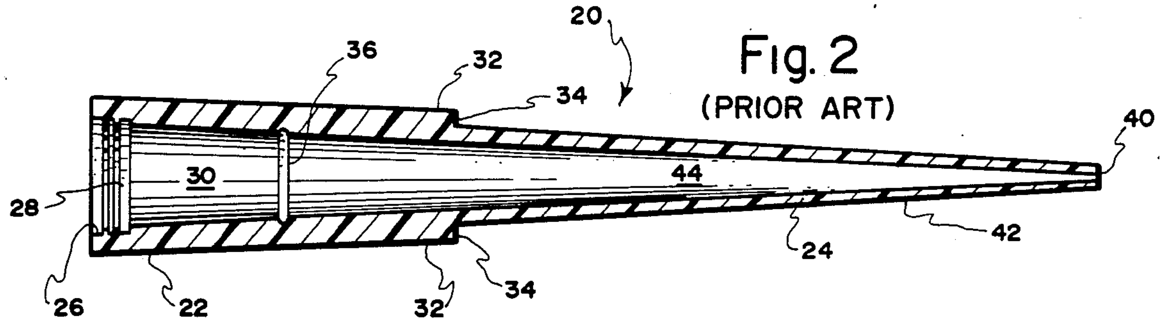
Fig. 2
(PRIOR ART)
Fig. 3
(PRIOR ART)
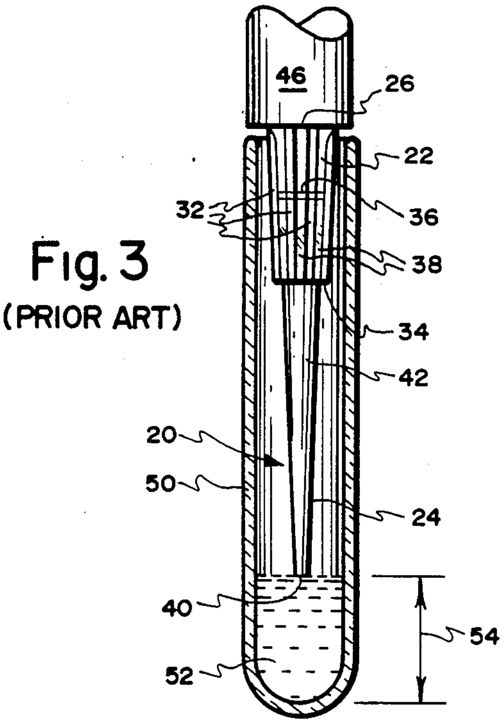
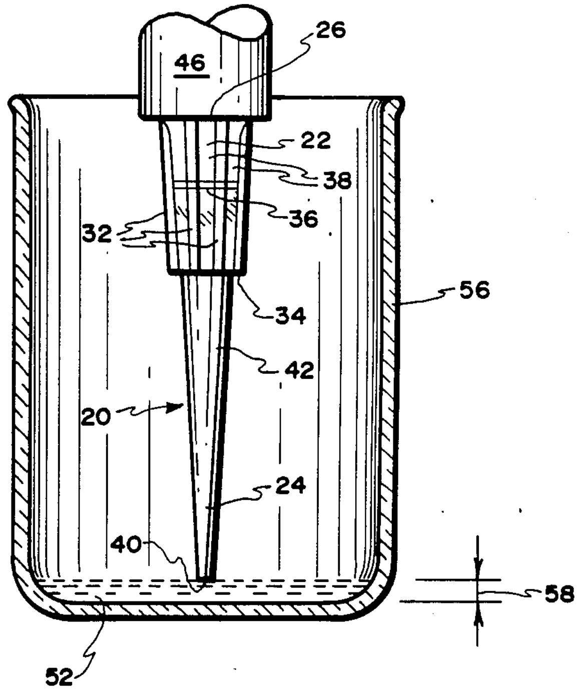
Fig. 4
(PRIOR ART)

MEDICAL MICRO PIPETTE TIPS FOR DIFFICULT TO REACH PLACES AND RELATED METHODS

FIELD OF INVENTION

The present invention relates generally to pipette tips and more particularly to low cost medical micro pipette tips for difficult to reach places, and related methods.

PRIOR ART

The known prior art is illustrated in FIGS. 1 through 4, and comprises low cost essentially rigid pipette tips formed of synthetic resinous material, which are of relatively large trasverse dimensions and limited length. It is impossible to fully evacuate expensive liquid extract from test tubes, vials and the like using prior art pipette tips of the type illustrated in FIGS. 1-4. Unsuccessful attempts have been made by others to extend and narrow the leading end of low cost medical micro pipette tips to provide flexibility and substantial reduced size, to enhance extract pick-up in difficult to reach places without destroying the operability of such during attempted use, i.e. by crimping, kinking or otherwise occluding the small interior passageway. For example, heat stretching of the leading end of a low cost prior art tip, of the type illustrated in FIG. 1, produced an inoperable and medically unacceptable elongated micro pipette tip. Complex and expensive apparatus has also been proposed, which is of general interest only.

BRIEF SUMMARY AND OBJECTS OF THE PRESENT INVENTION

In brief summary, the present invention comprises low cost medical micro pipette tips for difficult to reach places, and related methods. In the present preferred configurations of the present invention, the leading or distal portion of the micro pipette tips are materially elongated and ultra thin when compared with the prior art and are flexible, but non-occluding. This accommodates placement of the distal influent/effluent port, for receiving and discharging biological extracts, in hard to reach places, such as between closely placed testing plates used in biological electrophoresis, or directly or arcuately, without occlusion, into the lowest normally inaccessible regions of test tubes and vials, which hold residual amounts of very costly biological extracts.

Accordingly, it is a primary object of the present invention to provide novel pipette tips, and related methods.

A further significant object of this invention is the provision of novel low cost medical micro pipette tips for difficult to reach places, and related methods.

Another important object is the provision of unique medical micro pipette tips for difficult to reach places wherein the distal end portion thereof is flexible, elongated and ultra thin but non-occluding.

An additional object of the present invention is the provision of a novel medical micro pipette tip which accomodates placement of the distal end influent port, for receipt of biological extracts, in hard to reach normally inaccessible places, without occlusion of the internal flow path within the micro pipette tip.

These and other objects and features of the present invention will be apparent from the detailed description taken with reference to the accompanying drawings.

BRIEF DESCRIPTION OF THE DRAWINGS

FIG. 1 is a perspective representation of a conventional prior art pipette tip used in the medical field;

FIG. 2 is a cross-section taken along lines 2—2 of FIG. 1;

FIG. 3 is an elevational view, shown partly in cross-section, illustrating the manner in which the prior art conventional pipette of FIG. 1 is used to withdraw extract from a test tube;

FIG. 4 is an elevational view, shown partly in cross-section, illustrating the manner in which the conventional prior art pipette of FIG. 1 is used to withdraw extract from a vial or beaker;

DETAILED DESCRIPTION OF THE ILLUSTRATED EMBODIMENTS

Figure 5:
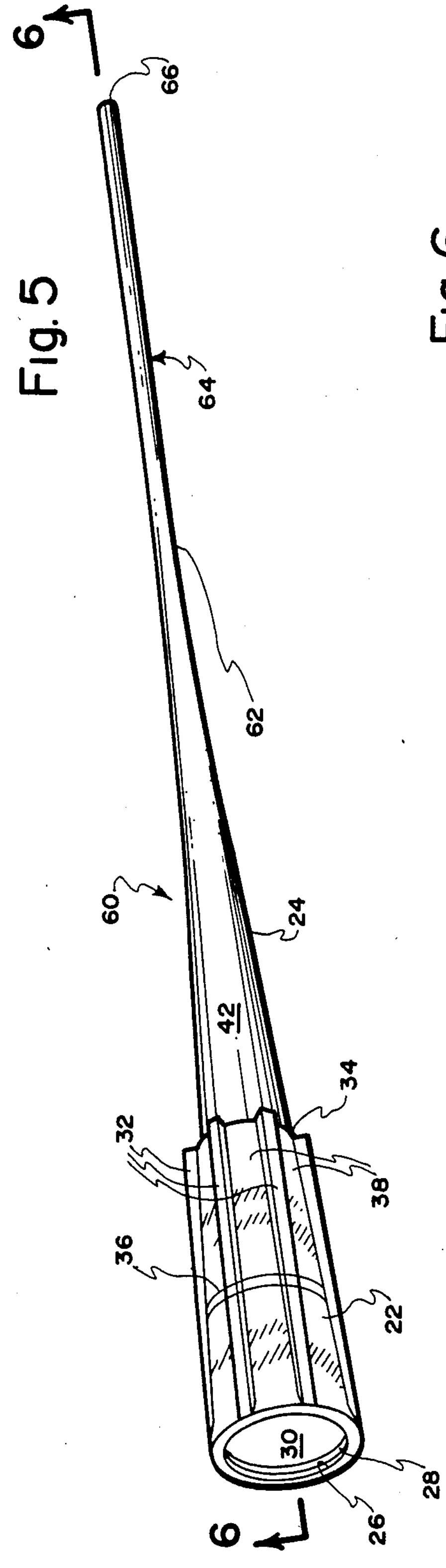
FIG. 5 is a perspective representation of a presently preferred medical micro pipette tip comprising an ultra thin elongated distal end portion, in accordance with the principles of the present invention.
Figure 6:
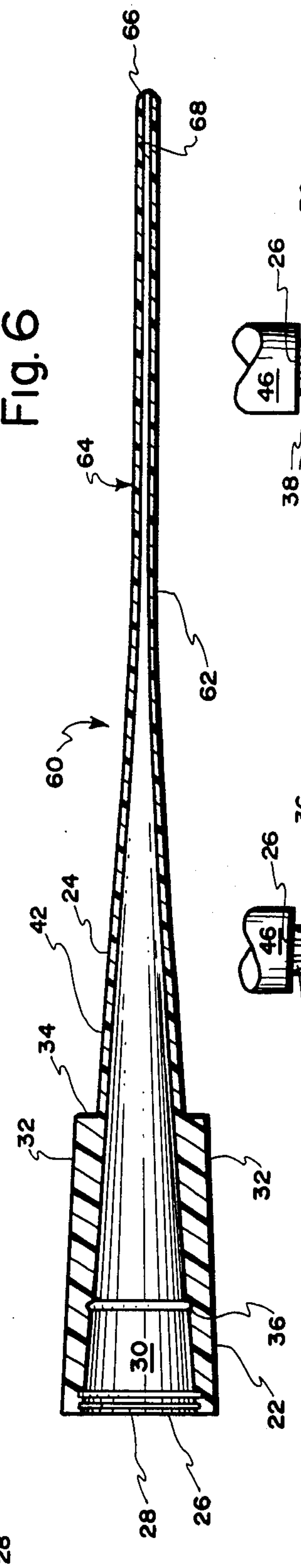
FIG. 6 is a cross-section taken along lines 6—6 of FIG. 5.

It is commonplace in the medical field to engage in various forms of testing of solutions wherein a known amount of solution is removed from a container or confinement site, using a pipette tip, and thereafter placed from the pipette tip in various types of testing equipment for medical processing. Such solutions or extracts are typically very expensive. It is, therefore, very important that such extracts not be wasted. By way of example, RNA extract and DNA extract, each of which contains genes, are obtained by withdrawing blood from a patient. These extracts are withdrawn from a container or confinement site, such as a beaker, vial or test tube, using a pipette tip and are processed as indicated. Sometimes, but not always, the extract testing process includes electrophoresis techniques.

In the past, it has been difficult, if not impossible to reach and remove all or substantially all of such extracts from their containers or confinement using state-of-the-art pipette tips. The rigidity and limited length of the conventional prior art pipette tips have made it impossible for such tips to fully evacuate such extracts from their containment or confinement. Accordingly, a substantial economic waste has occurred due to inefficiency.

Prior attempts to extend the length of the distal end portion of such prior art pipette tips to provide better access to difficult to reach places where, for example, residual extract exists have failed. For example, heat stretching of the conventional pipette tips resulted in occlusion of the interior pipette flow path during use. The basic problem resides in the inability of the prior art to mold or otherwise fabricate a medical micro pipette tip having an elongated ultra thin distal end portion which accommodates curvilinear displacement while at the same time retaining the structural integrity of the distal pipette wall thereby preventing occlusion of the flow path within the pipette tip.

The present invention has solved this long-standing problem by providing an ultra thin elongated distal end for a medical micro pipette tip wherein a high degree of flexibility is provided for reaching remote and heretofore inaccessible areas, where residual expensive extracts remains and which also has the structural integrity to prevent crimping, buckling, etc. when placed in a radical curvilinear position, wherein the liquid flow path along the hollow interior of the pipette at the distal end portion is not occluded.

Specific references is now made to the drawings wherein like numerals are used to designate the like parts throughout. Specifically, FIGS. 1–4 illustrate a conventional prior art pipette tip used to remove medical extract from a storage location to test apparatus. The pipette tip of FIG. 1 is generally designated 20. Pipette tip 20 comprises a proximal end portion 22 and a distal end portion 24. The proximal end portion 22 comprises a proximal port 26 and adjacent sealing rings 28 by which the tip 20 is secured on to any one of several conventional support tools for use.

Typically a plurality of pipette tips 20 are carried in spaced relation by the same support structure and simultaneously inserted respectively into independent containers, such as an array of test tubes, to remove extract. Thereafter the pipettecontained extract is discharged simultaneously from the array of pipette tips into closely spaced independent testing locations, in accordance with current medical testing techniques.

The proximal end portion 22 of the tip 20 comprises a smooth circular interior barrel 30, which tapers essentially uniformly in a converging configuration from back to front (left to right as viewed in FIG. 1). The normal wall thickness of the proximal end portion 22 is on the order of about 20/1000th of one inch. The proximal end portion 22 comprises several exposed longitudinally directed external ribs 32, which provide strength. The exterior surface of the pipette tip 20 is annularly stepped at shoulder 34.

The smooth tapered interior 30 comprising the flow path within the pipette tip 20 at the proximal end portion 22 is interrupted by an internal annular groove 36. The material from which the pipette tip 20 is fabricated comprises a synthetic resinous material, such as polypropylene, and is transparent or substantially transparent in its preferred form. The groove 36 is, therefore, readily visually perceptible from the exterior of the tip 20 through the wall thereof. In the course of drawing extract into the pipette 20, the operator knows that the desired predetermined quantity of extract has been received within the hollow interior of the pipette tip 20 when the upper level of the extract is visually identified as having reached the groove 36. Note that the exterior surface along the surfaces 38 of the proximal end portion 22 is tapered at essentially the same rate as the interior surface 30.

The pipette tip 20 also comprises a rigid distal end portion 24 extending from the shoulder 34 to the distal edge 40. The distal edge 40 is illustrated as being blunt, i.e. disposed entirely in a plane perpendicular to the axial center line of the tip 20. The distal end portion 24 of the pipette tip 20 is uniformly tapered inside and out as surfaces 42 and 44, respectively. The wall thickness remains constant throughout the length of the distal end portion 24 and is of such a nature that it may not be materially bent, flexed or curvilinearly displaced.

Thus, the pipette tip 20 of FIG. 1 is used to remove extract from test tubes and beakers as illustrated in FIGS. 3 and 4, the pipette tip 20 being mounted to a suitable conventional apparatus 46. The constraints of the removal procedure using the pipette tip 20, in relation to a conventional extract test tube 50, are illustrated in FIG. 3, wherein a residual amount of extract 52 in the lower length 54 of the test tube 50 will remain at the end of the withdrawal procedure of extract into the pipette tip 20. Likewise, a residual quantity of extract 52 will remain in the beaker or vial 56 (FIG. 4) to a depth of 58 when the removal process has been completed, using the pipette tip 20. This results in a costly waste of extract and constitutes a long-standing problem in the art, not solved by proposals of others.

As a result of the problem mentioned immediately above, and the futile efforts of the prior art to successfully address the problem, it has long been thought impossible to provide a low cost, disposable ultra thin elongated medical micro pipette tip capable of being placed in heretofore inaccessible places to remove substantially all contained or confined extract to prevent inefficient waste thereof. The present invention, for the first time, provides a solution to the above-mentioned long-standing problem.

One presently preferred pipette tip embodiment of the present invention, generally designated 60, is illustrated in FIG. 5. Pipette tip 60, from left to right up to site or location 62, is identical to the pipette tip 20 illustrated in FIGS. 1–4 and described above, with the exception, that the distal barrel has been substantially lengthened to provide an elongated, ultra thin integral extension 64. Location 62 of tip 60 is the same distance from shoulder 34 as is edge 40 of tip 20. With the exception of extension 64, the pipette tip 60 is illustrated as being identical to the pipette tip 20, identical numerals have been provided on FIGS. 5–8 and no further description thereof is believed needed.

The elongated extension 64 is formed as one piece with the remainder of the tip 60 using injection molding techniques. This preferably comprises procedural steps identified in greater detail hereinafter. By way of contrast, the wall thickness of the portion 24 typically is within the range of 15 to 20/1000ths of 1 inch, thereby providing substantial rigidity, whereas the wall thickness of the extension 64, terminating in tapered edge 66 must be within the range of 4 to 10/1000ths of 1 inch, for proper flexibility coupled with sufficient wall integrity to prevent occlusion of the central passage 68. The use of a taper at edge 66 has been found to more readily release extract liquid which otherwise would be retained by surface friction. It has been found that the central passageway 68 should have a diameter within the range of 10 to 20/1000ths of 1 inch, 15/1000ths being presently preferred. It has been found that extension 64 typically should comprise a length on the order of 1-1½ inches, while the length of the remainder of the tip 60 is typically on the order of 2 inches.

In the normal course of events, the injection molding of a pipette tip 60 involves utilization of an elongated core. Conventional core forming techniques normally require grinding of the core to the required diameter. It has, however, been found that conventional core forming grinding techniques cannot produce a core having a distal core portion by which a pipette flow path of on the order of 15/1000ths of an inch in diameter can be injection molded. The present pipette tip invention has been accommodated by use of novel core forming technique.

Figure 15:
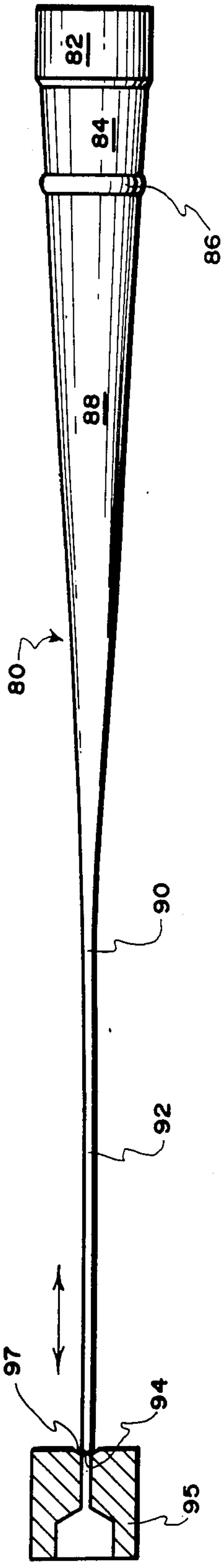
FIG. 15 is a preferred core used in fabricating the pipette tip of FIG. 5.

Specific reference is now made to FIG. 15, which illustrates the presently preferred core use in forming medical micro pipette tips 60, the core being generally designated 80. Core 80 comprises a cylindrical base 82, and initial tapered section 84, the presently preferred angle of taper thereof being 2 degrees 08 minutes. An annular projection 86 is integral with the tapered portion 84 and further merges with a tapered section 88, the preferred angle of taper of which is 2 degrees 43 minutes.

Tapered section 88 ends at site 90, which corresponds to site 62 of the pipette tip 60. Site 90 comprises a sanded and polished silver solder site at the end of the heretofore described portion of core 80. Silver solder site 90 merges integrally with and unites to a sewing needle, of conventional stock, 92, the uniform diameter of which is illustrated as being 15/1000ths of one inch. The utilization of the sewing needle 92 as an integral part of the core 80 accommodates, surprisingly, the formation of problem-solving pipette tips, in accordance with the principles of the present invention.

The remainder of the core 80, apart from the needle 92, is preferably formed of stainless steel, capable of resisting corrosion when used within the interior of injection molding apparatus. The flexible nature of the needle 92 does not provide for independent self-centering of the needle portion of the core 80. It has been found necessary to provide a centering abutment 95, having a tapered exposed wall surface 97 converging at a center point, into which the tip 94 of the core 80 is inserted as the core is reciprocated into its injection molding position, causing the entirety of the core 80 to be axially aligned with precision. Nevertheless, ample room exists through which air is evacuated at abutment 95 from around the core during the injection molding process.

It has been found to be essential that a resin having high melt and easy flow characteristics is essential for the formation of the ultra thin wall of the extension 64. It is also essential that once the injection molded medical micro pipette tip 60 has been formed that the resin forming the same be durable during use. While there are other suitable resins available, it is presently preferred that the tip 60 be formed of polypropylene PD 701 N, available from Himont. Calcium styrate may be used as an additive to the resin to aid in improving the flow characteristics into the mold cavity during the injection molding process.

The pipette tip 60 is constructed to fit a variety of commonly used instruments available in chemical testing laboratories. The mouth of the tip is designed to enable small volume pipetting with good accuracy and to prevent the liquid extract from clinging to the outside of the tip.

Figure 7:
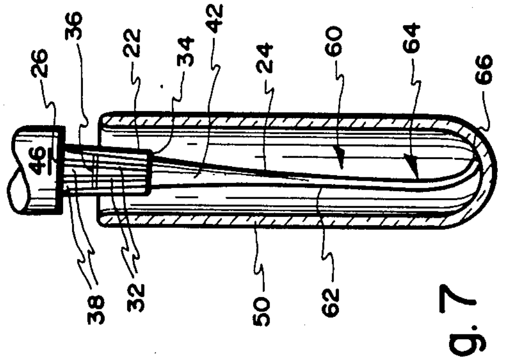
FIG. 7 is an elevational view, shown partly in cross-section, of the micro pipette tip of FIG. 5 illustrated as being used to remove substantially all of the extract within a test tube.
Figure 8:
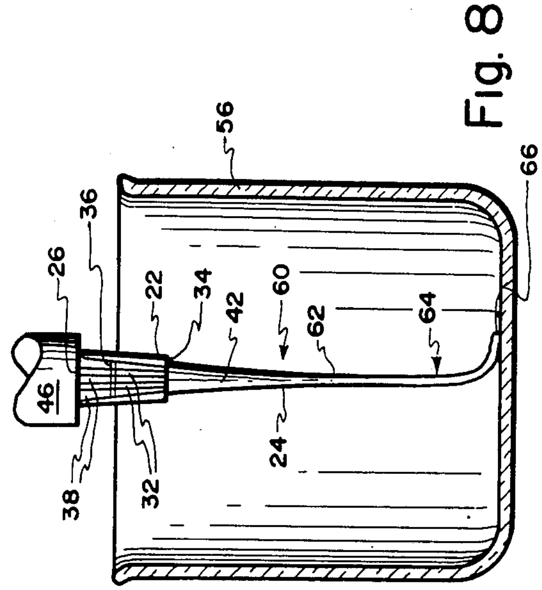
FIG. 8 is an elevational view, shown partly in cross-section, section, of the micro pipette tip of FIG. 5 illustrated as being used to remove substantially all of the extract in a vial or beaker.

In use, as illustrated in FIGS. 7 and 8, the pipette tip 60, attached to an appropriate withdrawal instrument 46, is inserted into a test tube 50 or vial 56 until the flexible extension 64 forcibly engages the bottom of the test tube or vial and is curvilinearly deflected so that the opening at the distal end of passageway 68 is essentially horizontally oriented and can withdraw substantially all of the RNA, DNA or like extract disposed along the bottom of the container.

Thus, the user is able to press the leading end of the pipette tip 60 to a generally horizontal position, through 90 degrees; which enables the pipette to draw up substantially all of the extract from the bottom of the container, independent of whether or not the container is a relatively long small diameter test tube, such as test tube 50, or a beaker or a vial, such as container 56.

The zero draft inside diameter of the passageway 68 is helpful in its capillary characteristics, which aid in dispensing ultra micro volumes of the extract samples, as required for laboratory testing. These volumes are typically 0.5 to 50 micro liters.

Figure 9:
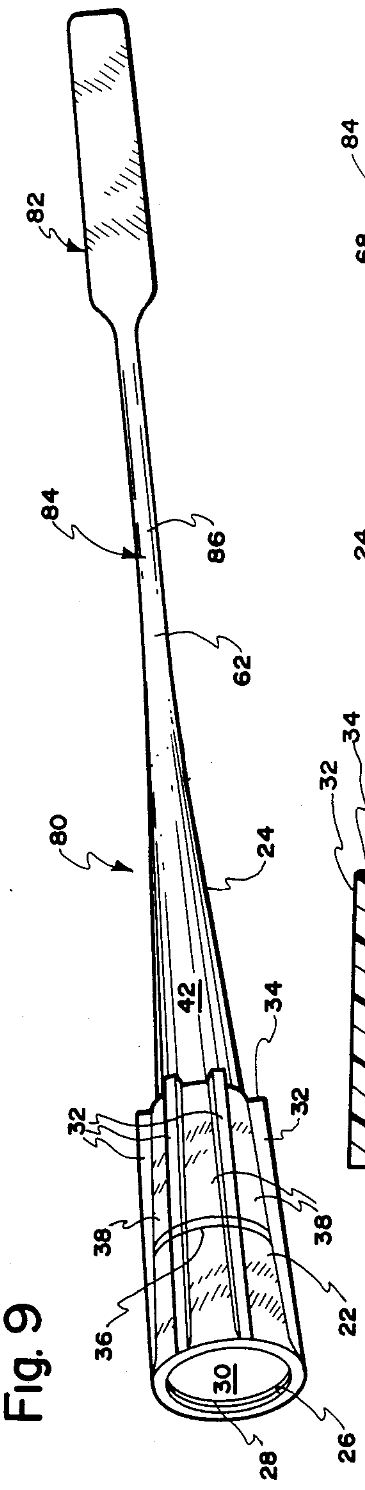
FIG. 9 is a perspective representation of a second presently preferred medical micro pipette tip fabricated in accordance with the principles of the present invention.
Figure 10:
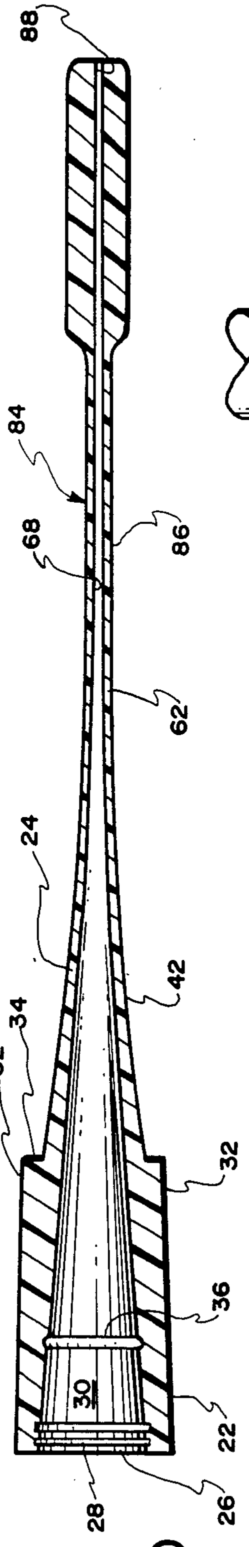
FIG. 10 is a longitudinal cross-section taken along the axially center line of the medical micro pipette tip of FIG. 9.

It is presently preferred that the second preferred medical micro pipette tip of the present invention, generally designated 80 and illustrated in FIG. 9, be formed by further fabrication of the pipette tip 60, heretofore described and illustrated in FIG. 5.

With the exception of the duckbill distal end region 82, the micro pipette tip 80 is illustrated as being the same as the already described micro pipette tip 60 and is so identified by identical numerals in FIGS. 9–12, requiring no further description. However, since the flattened leading portion 82 of the extension 84 is modified in respect to the extension 64 of tip 60, further description in this regard is necessary. Approximately one half of the extension 84 is modified to form the duckbill end 82. Therefore, approximately one half of the extension 84, shown at the left of the duckbill end 82 in Figure 9 and identified by the numeral 86 is identical to the left one half of the extension 64 (as viewed in FIG. 5) and, therefore, no further description is believed to be needed. The duckbill section 82 comprises a flattened end comprising a passageway 88 which is rectangular in cross-section. Passage 88 is aligned with and extends the passage 68. The rectangular dimensions of passage 88 are preferably on the order of 5/1000ths by 15/1000ths of 1 inch, whereas the passageway 68 is preferably 15/1000ths of 1 inch in diameter. The short flattened wall thickness of the distal end portion is on the order of 2–3/1000ths of one inch.

Figure 11:
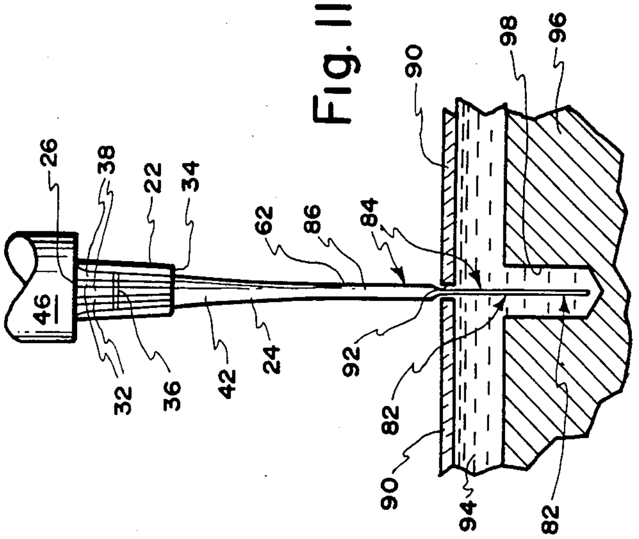
FIG. 11 illustrates in elevation the manner in which the micro pipette tip of FIG. 9 is used in an electrophoresis process to dispense extract into a cup-shaped recess in a gel layer wherein the micro pipette tip of FIG. 9 is required to enter the electrophoresis environment between the two narrowly spaced plates.
Figure 12:
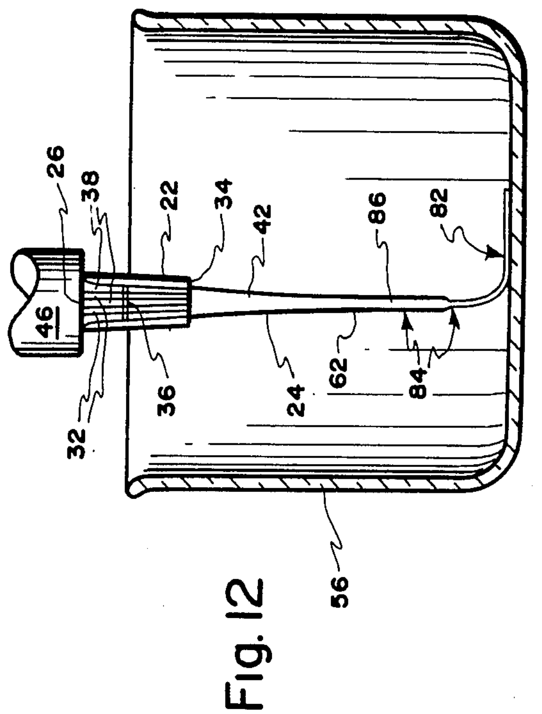
FIG. 12 in an elevational view, shown in cross-section, illustrating the manner in which the pipette tip of FIG. 9 may be used to substantially fully evacuate extract from a vial or beaker.

The flattened end 82, accommodates pickup of extract, to substantially empty containers such as beakers, test tubes and vials (as shown in FIG. 12), so that waste of expensive extract is avoided. At the same time, entry of the flattened portion 82 between lectrophoresis glass plates into fluid pockets formed in gel, is accommodated, as illustrated in FIG. 11. The glass plates 90, used conventionally in the electrophoresis process are closely spaced along slot 92, the rigid width of which is less than the transverse dimension of the extension 64 of the tip 60 but more than the out-to-out narrow dimension of about 10/1000ths of 1 inch of the flexible duckbill end portion 82.

The plates 90 rest upon a layer of liquid 94, superimposed upon a body of gel 96 into which pockets or gel wells 98 were earlier formed by a spiked tool. The flexible end 82 of the pipette tip 80 is, therefore, desirable in dispensing the extract from pipette tip 80 into well 98 for use in the electrophoresis testing process. Because of the indicated flexibility of the extension 84, including duckbill portion 82, the surface of the associated gel well or pocket 98 is not damaged during the extract injection process, as illustrated in FIG. 11.

Figure 14:
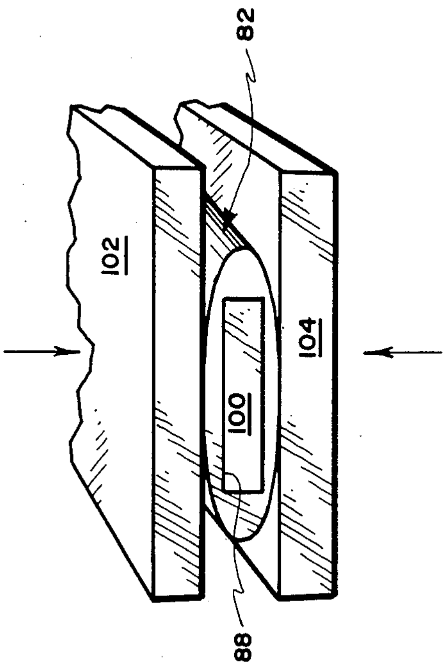
FIGS. 13 and 14 illustrate diagramatically the manner in which the medical micro pipette tip of FIG. 5 can be further fabricated to create the micro pipette tip of FIG. 9.
Figure 13:
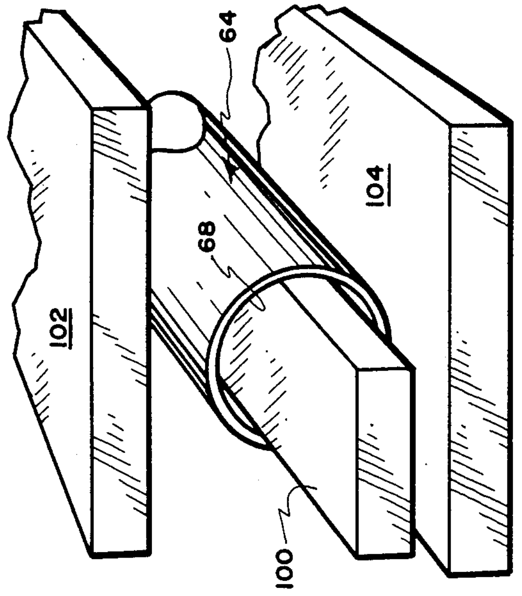

Reference is now made to FIGS. 13 and 14 which illustrate the preferred manner, presently contemplated for further fabricating a pipette tip 60 into pipette tip 80. Specifically, a stainless steel mandrel 100, which is rectangular in configuration and has a length slightly in excess of the length of the desired duckbill portion 82 is inserted into the hollow interior passage 68 of a pipette tip 60. The preferred cross-sectional dimensions of the mandrel 100 are 5/1000ths by 15/1000ths of one inch, and the preferred inside diameter of the extension 64 is 15/1000ths. Conventional heat press jaws 102 and 104, diagramatically illustrated in FIG. 13 and 14, are also provided. The jaws 102 and 104 are closed and a sufficient amount of heat and pressure are used to heat soften and redistribute the synthetic resinous material comprising the distal end of the extension 64 of the tip 60, covering approximately one half the length thereof, as illustrated in FIG. 14. This permanently alters the leading end portion of the extension 64 to form the duckbill section 82 (FIG. 9). Upon opening of the heat pressed jaws 102 and 104 and removal of the pipette tip 80 from the rectangular mandrel 100, the duckbill portion 82 of the tip 80 is allowed to cool, after which it is ready for use upon sterilization as required.

While the foregoing description has been directed to the formation of a single pipette tip 60 or the fabrication of a pipette 80 from a pre-existing tip 60, it is to be appreciated that in the normal course of commercial manufacturing, multiple cavity molds are provided and a series of mandrels 100 used to simultaneously form a plurality of tip 60 and 80, respectively, as described.

The use of a duckbill end such as duckbill end 82 is sometimes desirable for use in conjunction with the conventional tip 20, illustrated in FIG. 1. This duckbill modification of a conventional tip 20 is accomplished as described above and provides a great deal of flexibility at the distal end portion of the pipette tip. This accommodates entry of the distal end of the resulting pipette tip into electrophoresis wells 98 through narrow slot 92 between plates 90.

The invention may be embodied in other specific forms without department from the spirit or essential characteristics thereof. The present embodiment, is, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. A low-cost micro volume pipette tip formed as one-piece from synthetic resinous material comprising:

one-piece wall means extending end-to-end defining an axial bore extending the entire length of the micro pipette tip, the bore precisely defining an interior micro liter volume of predetermined magnitude;

the one-piece wall means defining proximal means by which a pipetting instrument is releasably attached thereto in fluid tight relation;

the one-piece wall means comprising a stiff elongated conical section extending convergently from the proximal means in a forward direction, the conical section comprising a tapered exterior surface, a rigid wall and a tapered interior surface defining a conical axially-directed proximal bore;

the one-piece wall means comprising an elongated leading end portion comprising a substantially zero draft axial capillary bore ending in a minute port, the substantially zero draft capillary bore being aligned and in direct fluid communication with the conical axially-directed proximal bore, the leading end portion comprising ultra thin wall means, the radial thickness of which is not greater than 10/1000ths of one inch such that the leading end portion of the micro pipette tip extend generally linearly when unstressed but when the leading end thereof immediately adjacent to the minute port is manually forced against the bottom of a container of biological extract of the like, the leading end adjacent to port will become sharply curvilinearly disposed through up to 90 degrees without occlusion of the substantially zero draft capillary bore so that essentially all of the extract can be evacuated including the extract contiguous with the bottom of the container which is evacuated parallel to the bottom of the container while the leading end is disposed in such sharply curvilinear orientation.

2. A small volume micro pipette tip comprising:

an essentially rigid hollow elongated proximal end portion comprising means to be connected to liquid displacement apparatus;

a readily yieldable elongated distal end portion integral with the proximal end portion and having a substantial length, the elongated distal end portion defining an influent/effluent minute end port and a hollow capillary bore portion by which a precise predetermined micro liter volume of biological extract or like liquid to be tested is axially introduced into and later axially discharged from a hollow capillary bore within the micro pipette tip, the capillary bore portion within the distal end having substantial length and a substantially zero draft diameter of not more than 20/1,000ths of one inch;

the yieldable elongated distal end portion comprising ultra thin wall means having a thickness adjacent the port of not more than 10/1,000ths of one inch accommodating displacement of the elongated distal end portion sharply up to a curvature of 90 degrees, caused by forcible engagement of the distal end portion adjacent the port with a wall surface of a container in which the liquid is disposed, without material construction or occlusion of the capillary bore;

whereby the angularly disposed distal end portion accommodates evacuation of substantially all of the liquid from the container.

3. A low-cost micro pipette tip formed from synthetic resinous material solely by injection molding as one piece comprising:

an essentially rigid hollow proximal end portion comprising means by which pipetting apparatus is releasably attached to the micro pipette tip;

a readily yieldable elongated distal end portion defining an influent/effluent minute port and a hollow interior bore portion through which a precise micro liter volume of biological extract or like liquid to be tested is drawn and later removed from a hollow interior bore within the micro pipette tip, the portion of the bore within the distal end being of substantially uniform capillary diameter throughout;

the yieldable elongated distal end portion comprising ultra thin wall means of substantial length, the thickness of the wall means and the diameter size of the distal end portion bore adjacent the port forming a ratio within the range of at least 1/5 and not more than ½ accommodating short curvature displacement of the elongated distal end portion directly adjacent the port through up to 90 degrees, caused by forcible engagement of the elongated distal end portion at the port thereof with a wall of a container in which the liquid is disposed, without material constriction or occlusion of the distal end portion bore;

whereby the angularly disposed distal end portion accommodates evacuation of substantially all of the liquid from the container.

4. The micro pipette tip according to claim 3 wherein at least the distal end portion is formed of a durable synthetic resinous material having high melt and easy flow characteristics.

5. The micro pipette tip according to claim 3 wherein a leading end of the distal end portion is minutely externally tapered.

6. A micro volume pipette tip for electrophoresis use formed from synthetic resinous material, the micro volume pipette tip comprising:

an essentially rigid proximal end portion having an axial bore and means to be connected to pipetting apparatus;

a flattened planar distal end portion comprising a capillary bore extending therethrough and being disposed in liquid communication with the proximal end bore, the capillary bore terinating in a minute influent/effluent port by which a precise known micro volume of biological extract or like liquid to be tested is drawn into and removed from the capillary bore within the micro volume pipette tip.

the flattened planar distal end portion defining an exterior wall having an out-to-out thickness inclusive of capillary bore of not greater than 10/1000ths of one inch accommodating placement of the distal end portion through a narrow gap between plates of an electrophoresis testing apparatus and release of liquid through the minute port means into a testing well.

7. A micro pipette tip according to claim 6 wherein the wall means of the flattened distal end portion so that the distal end portion can be displaced through a short curvature up to 90 degrees, caused by forcible engagement of the distal end portion with a surface of a container in which the liquid to be drawn into the micro volume pipette tip is disposed, without material constriction or occlusion of the capillary bore;

whereby the angularly displaced distal end portion accommodates evacuation of substantially all of the liquid from the container.

8. A micro pipette tip according to claim 6 wherein the capillary bore of the distal end portion is generally rectangular in its cross sectional configuration.

9. A micro pipette tip according to claim 8 wherein the transverse dimensions of the generally rectangular capillary bore are on the order of 5/1000ths by 15/1000ths of one inch.

10. A medical micro pipette tip according to claim 6 wherein the short flattened wall thickness of the distal end portion on each side of the capillary bore is not greater than 3/1000ths of one inch.

* * * * *

UNITED STATES PATENT AND TRADEMARK OFFICE

CERTIFICATE OF CORRECTION

PATENT NO. : 4,707,337

DATED : November 17, 1987

INVENTOR(S) : David H. Jeffs, et. al.

It is certified that error appears in the above-indentified patent and that said Letters Patent is hereby corrected as shown below:

Column 8, line 47, "a" should read --the--.

Column 8, line 48, after "bore" insert --portion--.

Column 9, line 10, "a" should read --the--.

Column 9, line 10, after "bore" insert --portion--.

Column 10, line 22, after "portion" insert --are constructed--.

Signed and Sealed this

Fourteenth Day of September, 1993

Attest:

BRUCE LEHMAN

*Attesting Officer* *Commissioner of Patents and Trademarks*